(12) United States Patent
Ozkan et al.

(10) Patent No.: US 11,211,598 B2
(45) Date of Patent: Dec. 28, 2021

(54) METAL OXIDE NANOFIBER ELECTRODE AND METHOD

(71) Applicant: The Regents of the University of California, Oakland, CA (US)

(72) Inventors: Cengiz S. Ozkan, San Diego, CA (US); Mihrimah Ozkan, San Diego, CA (US); Jeffrey Bell, Northridge, CA (US); Rachel Ye, Riverside, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 318 days.

(21) Appl. No.: 15/776,720

(22) PCT Filed: Nov. 16, 2016

(86) PCT No.: PCT/US2016/062263
§ 371 (c)(1),
(2) Date: May 16, 2018

(87) PCT Pub. No.: WO2017/087512
PCT Pub. Date: May 26, 2017

(65) Prior Publication Data
US 2018/0301690 A1    Oct. 18, 2018

Related U.S. Application Data

(60) Provisional application No. 62/255,827, filed on Nov. 16, 2015.

(51) Int. Cl.

| | | |
|---|---|---|
| *H01M 4/131* | (2010.01) | |
| *H01M 10/0525* | (2010.01) | |
| *H01M 4/80* | (2006.01) | |
| *H01M 4/134* | (2010.01) | |
| *B22F 1/02* | (2006.01) | |
| *B22F 9/20* | (2006.01) | |
| *H01M 4/52* | (2010.01) | |
| *B22F 3/00* | (2021.01) | |
| *D01D 5/00* | (2006.01) | |
| *H01M 4/1391* | (2010.01) | |
| *H01M 4/66* | (2006.01) | |
| *C22C 47/04* | (2006.01) | |
| *H01M 4/04* | (2006.01) | |
| *B22F 1/00* | (2006.01) | |
| *H01M 4/1395* | (2010.01) | |
| *H01G 11/46* | (2013.01) | |
| *H01G 11/50* | (2013.01) | |
| *H01M 10/052* | (2010.01) | |
| *H01M 4/02* | (2006.01) | |

(52) U.S. Cl.
CPC .......... *H01M 4/131* (2013.01); *B22F 1/0044* (2013.01); *B22F 1/02* (2013.01); *B22F 3/002* (2013.01); *B22F 9/20* (2013.01); *C22C 47/04* (2013.01); *D01D 5/0007* (2013.01); *H01M 4/0402* (2013.01); *H01M 4/0483* (2013.01); *H01M 4/0492* (2013.01); *H01M 4/134* (2013.01); *H01M 4/1391* (2013.01); *H01M 4/1395* (2013.01); *H01M 4/52* (2013.01); *H01M 4/661* (2013.01); *H01M 4/806* (2013.01); *H01M 10/0525* (2013.01); *B22F 2304/05* (2013.01); *B22F 2999/00* (2013.01); *D10B 2101/20* (2013.01); *H01G 11/46* (2013.01); *H01G 11/50* (2013.01); *H01M 10/052* (2013.01); *H01M 2004/021* (2013.01)

(58) Field of Classification Search
CPC .. H01M 4/131; H01M 4/0483; H01M 4/0492; H01M 4/0402; H01M 4/134; H01M 4/1395; H01M 10/0525; H01M 4/1391; H01M 4/661; H01M 4/806; H01M 4/52; H01M 10/052; H01M 2004/021; C22C 47/04; B22F 1/0044; B22F 3/002; B22F 1/02; B22F 9/20; B22F 2999/00; B22F 2304/05; D01D 5/0007; H01G 11/46; H01G 11/50; D10B 2101/20; Y02E 60/10; Y02T 10/70
See application file for complete search history.

(56) References Cited

U.S. PATENT DOCUMENTS

| | | | |
|---|---|---|---|
| 2007/0166455 A1 | 7/2007 | Shen et al. | |
| 2013/0078510 A1 | 3/2013 | Reynolds et al. | |
| 2014/0332733 A1* | 11/2014 | Joo | ............. D01D 5/0015 252/513 |

FOREIGN PATENT DOCUMENTS

CN        108472725        8/2018

OTHER PUBLICATIONS

Yang et al; "NiO nanorod array anchored Ni foam as a binderfree anode for high-rate lithium ion batteries"; Journal of Materials Chemistry A; A, 2014, 2, 20022-20029 (Year: 2014).*
"International Application Serial No. PCT US2016 062263, International Preliminary Report on Patentability dated May 31, 2018", 5 pgs.

(Continued)

*Primary Examiner* — Muhammad S Siddiquee
(74) *Attorney, Agent, or Firm* — Schwegman Lundberg & Woessner, P.A.

(57) ABSTRACT

A nanofiber based micro-structured material including metal fibers with metal oxide coatings and methods are shown. In one example, nanofiber based micro-structured material is used as an electrode in a battery, such as a lithium ion battery, where the nanofibers of micro-structured material form a nanofiber cloth with free-standing, core-shell structure.

5 Claims, 6 Drawing Sheets

(56) References Cited

OTHER PUBLICATIONS

International Application Serial No. PCT/US2016/062263, International Search Report and Written Opinion, dated Jan. 30, 17, 20 pgs.
Bell, J, et al., "Freestanding Ni-NiO nanofiber cloth anode for high capacity and high rate Li-ion batteries", Nano Energy, [Online] retrieved from the internet: <URL:http://www.sciencedirect.com/science/artlcle/pil/S2211285515003742>, 47-56.

* cited by examiner

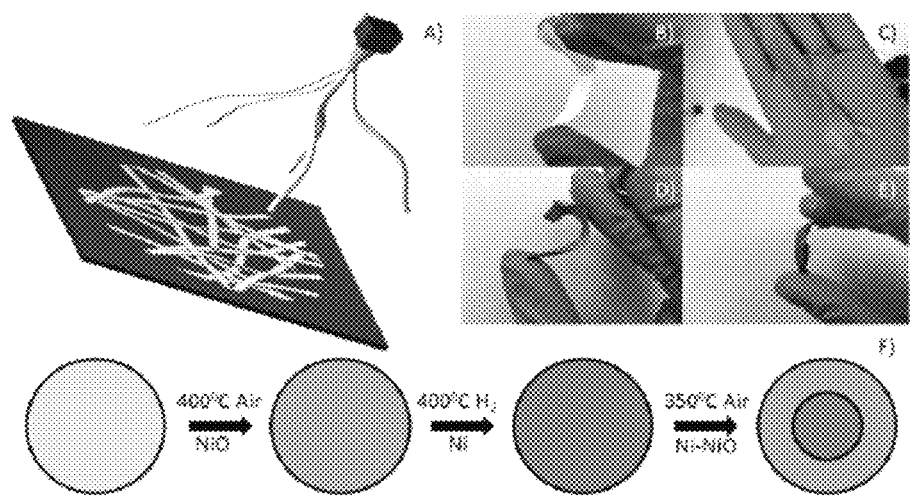

Figure 1. A) Electrospinning process. B) As spun nanofiber matte. C) Calcined NiO nanofibers. D) Reduced Ni nanofibers. E) Partially calcined Ni-NiO nanofibers. F) Schematic of the thermal oxidation/reduction process.

FIG. 1

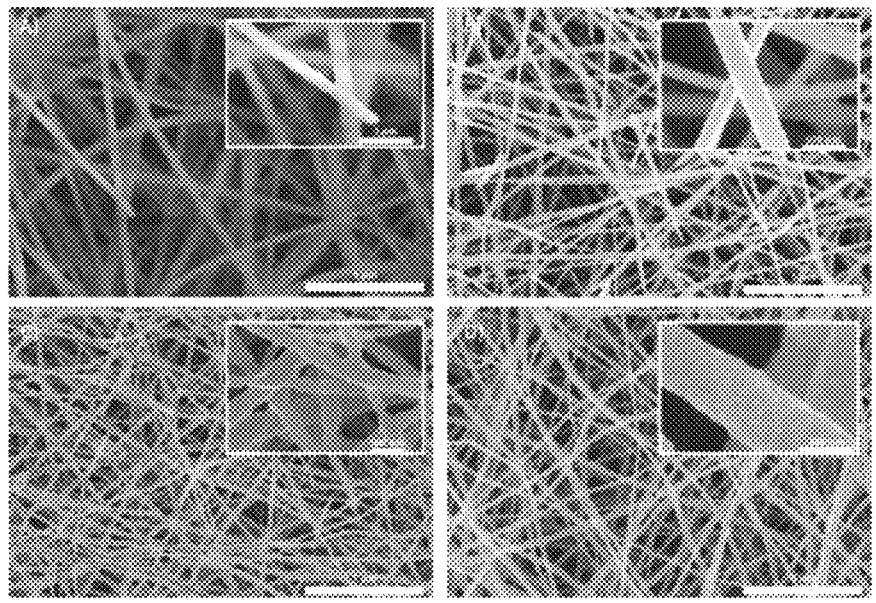

Figure 2. A) SEM image of pre calcined fibers. B) SEM image of NiO fibers post calcination. C) SEM image of Ni fibers post hydrogen reduction. D) SEM image of Ni-NiO fibers with inset image of fibers surface.

FIG. 2

Figure 3. A) TEM image of Ni-NiO cloth fiber. B) TEM image of Ni-NiO cloth fiber showing NiO thickness with inset SAED.

Figure 4. A) X-ray powder diffraction of NiO fibers, Ni fibers, and Ni-NiO fibers. B) EDS spectra of Ni-NiO fibers with inset display showing weight percentages after partial calcination. C) SEM image of EDS mapped area with inset images of elemental mapping.

Figure 5. A) CV of cycles 1-10 at a scan rate of 0.5 mVs⁻¹. B) CV of cycles 160-169 at a scan rate of 0.5 mVs⁻¹. C) Galvanostatic voltage profiles for Ni-NiO fibers at 1C for selected cycles. D) Galvanostatic voltage profiles for Ni-NiO fibers at selected C-rates.

Figure 6. A) Deep Galvanostatic cycling at 3C for more than 1000 cycles. B) Galvanostatic cycling at 1C, 1.5C, 2C, and 3C over 120 cycles.

Figure 7. A) SEM image post 400 Cycles at 3C B) SEM image post 400 Cycles at 3C with inset image magnifying fiber structure.

Figure 8. A) Shows complex impedance plots of Ni-NiO nanofiber anode for selected cycles. B) Shows high frequency regions of plots.

Figure 9. Electrical equivalent circuit used for fitting the complex impedance plots.

METAL OXIDE NANOFIBER ELECTRODE AND METHOD

CLAIM OF PRIORITY

This application is a U.S. National Stage Filing under 35 U.S.C. 371 from International Application No. PCT/US201.6/062263, filed on Nov. 16, 2016, and published as WO 2017/087512 A1 on May 26, 2017, which claims the benefit of priority to U.S. Provisional Patent Application No. 62/255,827, each of which is hereby incorporated by reference herein in its entirety.

TECHNICAL FIELD

This invention relates to metal oxide based material microstructures and methods. In one example, this invention relates to metal oxide nanofiber based anodes for lithium ion batteries.

BACKGROUND

Improved batteries, such as lithium ion batteries are desired. One example of a battery structure that can be improved is an anode structure.

BRIEF DESCRIPTION OF THE DRAWINGS

FIG. 1 shows a part of a method of making according to an example of the invention.

FIG. 2 shows micrographs of fibers according to an example of the invention.

DETAILED DESCRIPTION

Figure 3:
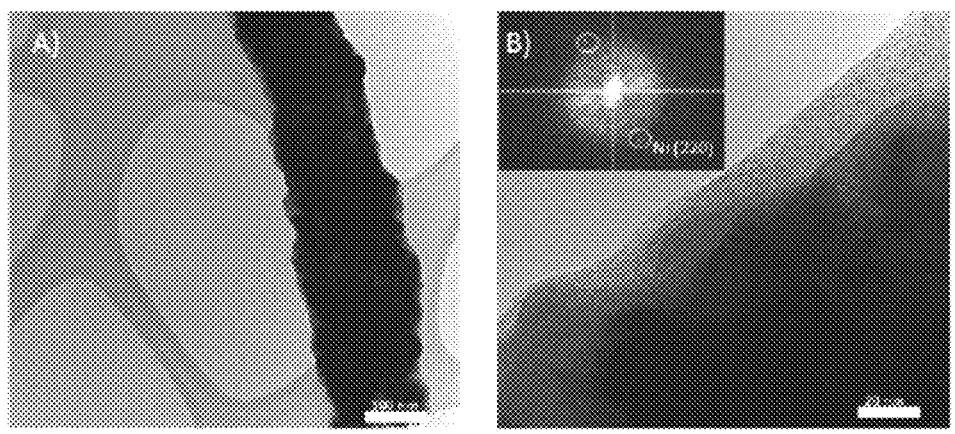
FIG. 3 shows TEM images of fibers according to an example of the invention.

In the following detailed description, reference is made to the accompanying drawings which form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, or logical changes, etc. may be made without departing from the scope of the present invention.

The following disclosure shows a low cost, free-standing, high capacity, stable, and environmentally benign metal oxide fiber cloth. In one example, the metal oxide is a nickel oxide. In one example, the nickel-nickel oxide (Ni—NiO) nanofiber cloth is used to form an anode for Li-ion batteries. Ni—NiO nanofibers are fabricated by electrospinning and thermal oxidation processes which create a free-standing, core-shell nanofiber structure. The nickel backbone mitigates poor conductivity issues observed in Li-ion anodes due to repeated volume change during lithiation/delithiation. The Ni—NiO nanofiber anode possesses a high surface area compared to that of a slurry cast electrode which helps facilitate Li-ion diffusion into the active material.

Electrochemical impedance spectroscopy indicates improved capability of current collecting metal (nickel in this case) to withstand volume change in our free-standing structure. Furthermore, scanning electron microscopy indicates the stability of the Ni—NiO nanofiber cloth anode in excess of 400 charge/discharge cycles, partly evidenced by the stable evolution of solid-electrolyte interphase. As an anode, the Ni—NiO nanofiber cloth shows impressive results with a gravimetric capacity of 1054 mAh $g^{-1}$ at a current density of 2154 mA $g^{-1}$ or 3 C (1 C=718 mA $g^{-1}$), a long cycle life of more than 1500 cycles, and exceptional stability throughout its cycle life with a Coulombic efficiency>99%. Performance evaluation enables the Ni—NiO cloth material for next-generation high capacity, high rate, stable, and environmentally benign Li-ion batteries.

Stable high rate, high capacity, and environmentally safe Li-ion battery (LIB) electrodes are at the center of research interest in energy storage. LIBs outperform other competing battery technologies currently in the market for portable electronics and are becoming the technology of choice to power next generation electric vehicles. Research seeks to meet market demands for cost effective, safe, and high performing LIBs through investigating novel materials possessing various nanostructures. LIB electrodes often consist of conductive additives, binder, current collector, and active material. One method of increasing the overall gravimetric capacity of a LIB cell is to eliminate the use of conductive additives and binders in the system. Binders and conductive additives can be replaced by utilizing free-standing electrodes with an embedded current collector. A free-standing electrode incorporates the current collector into the electrode architecture. This reduces the need for the use of binders or conductive additives. However, many of the active materials used are neither conductive enough nor capable of adhering themselves onto the current collector. Some free-standing electrodes based on carbon-textile or carbon-based paper, carbon-based nano-scaffolds, and electrospun fibers have been shown. These exhibit high capacities, fast cycling rates and long cycle lives but suffer from lengthy thermal oxidative stabilization, carbonization, and mechanical fragility.

Candidates for replacement of graphite as an anode—with a theoretical capacity of 372 mAh $g^{-1}$ include silicon, tin-based materials, a variety of transition metal oxides, and Li metal. These materials exhibit larger capacities than graphite, but suffer from potential drawbacks that span from volumetric expansion to poor Coulombic efficiency. Silicon, tin-based materials, and transition metal oxides suffer from volume changes during lithiation/delithiation or from poor conductivity. The volume change during cycling causes degradation in the electrode's morphology over the course of its cycle life. As a result, the active material loses contact with the conductive network and the solid electrolyte interface (SEI) layer degrades. Degradation of the SEI layer results in continual, thicker re-formation of the SEI layer that consumes electrolyte and lithium. Loss of contact with the conductive network and degradation of the SEI layer leads to a decrease in capacity and Coulombic efficiency. Li metal is the ideal material for an anode based on its high capacity, high conductivity, and its lack of need for diffusion/intercalation. The challenges facing Li metal as an anode include repeated formation of Li dendrites during lithiation/delitiation, low Coulombic efficiency, and safely concerns. Metal oxides show promise in alleviating many of the problems faced by next generation Li-ion batteries, but not without the correct electrode design.

Nickel (II) oxide (NiO) is emerging as a promising anode material for high capacity, long cycle life, low cost, and environmentally benign Li-ion batteries. This material system exhibits a high theoretical capacity of 718 mAh g$^{-1}$ and an ability to be easily transformed into various 3D structures for use in innovative electrodes. However, the electrochemical performance of NiO is limited by large variations in volume during lithiation/delithiation and poor conductivity. To combat this issue, various nanostructures have been employed to improve the electrochemical performance such as nanofibers, core-shell nanowires, and carbon structures coated in nickel oxides. Many of these structures exhibit a long cycle life up to thousands of cycles, exceptional cycling rates up to 10 C or high capacities up to 800 mAh g$^{-1}$. Although these structures have their advantages, none of them combine an outstanding cycle life, high charge current density, and exceptional capacity with a free-standing electrode.

Here we present a novel free-standing Ni—NiO nanofiber cloth anode synthesized by electrospinning and processed by simple heat treatments that address the aforementioned problems. The free-standing Ni—NiO nanofiber cloth anode exhibits a long cycle life of more than 1500 cycles, a high capacity of 1054 mAh g$^{-1}$ at a relatively fast cycling rate of 3 C (1 C=718 mA g$^{-1}$), and a Coulombic efficiency>99%. Most impressively though, the Ni—NiO fiber cloth anode maintained a high capacity of 1108 mAh g$^{-1}$ for more than 1500 cycles at 3 C with minimal changes in the morphology post cycling. To the best of our knowledge, an electrospun free-standing Ni—NiO nanofiber cloth anode with a nanostructured metal embedded within the active material serving as the current collector with such outstanding performance has not been previously reported.

For the preparation of the Ni—NiO fibers, 132 mg mL$^{-1}$ of Ni (OCOCH$_3$)$_2$.4H$_2$O and 66 mg mL$^{-1}$ of polyvinylpyrrolidone (PVP, 1 300 000 g mol$^{-1}$) were mixed in ethanol for 30 minutes at 70° C. After the solution was mixed thoroughly, the solution was transferred into a 5 mL syringe and electrospun using the Inovenso Ne300 Nanospinner. The feeding rate of the solution was 0.6 ml hr$^{-1}$ and the spinning potential was 6 kV, while the needle collector distance was 11 cm. After the fiber was spun, it was calcined within an Alumina tube at 400° C. for 6 hours in air at a heating rate of 0.66° C. min$^{-1}$ with 2 hours of thermal oxidation stabilization at 200° C. to obtain pure nickel oxide fibers. Thermal oxidation in total took 16 h to complete. The nickel oxide fibers were then reduced to nickel fibers by hydrogen reduction at 20 Torr and 400° C. for 90 minutes with a heating rate of 13° C. min$^{-1}$ under a constant flow of Ar/H$_2$ (1:2 volume ratio). The nickel fibers were cooled down at a cool rate of 20° C. min$^{-1}$. Lastly, the nickel fibers were re-calcined at 350° C. in air for 30 min with a heating rate of 20° C. min$^{-1}$ to get the Ni core, NiO shell fibers.

The morphology of the woven fibers was observed by scanning electron microscopy (Philips XL-30) and transmission electron microscopy (FEI Tecanai12). The synthesized fibers elemental makeup was characterized by X-ray powder diffraction (PANanalytical Empyrean) using Cu—K radiation and EDS (Electron Diffraction Spectroscopy). The makeup of the structure was determined by energy dispersive spectroscopy (Nova NanoSEM 50 Series).

Electrochemical measurements were carried out using a type 2032 coin cell with lithium foil acting as the counter electrode and a Celgard 25 um 3501 PP separator. The working electrode was prepared by cutting out pieces of Ni—NiO cloth. The resulting cloth was then placed inside the type 2032 coin cell. Assembly of the cells took place in an Argon filled glove box (H$_2$O<0.5 ppm, O$_2$<0.2 ppm, VAC). The electrolyte consisted of 1 m LiPF$_6$ dissolved in a mixture of Ethylene Carbonate (EC) and dimethyl carbonate (DMC) (1:1 wt.) containing 1% wt. additive of vinyl carbonate (VC). The loading of NiO in the cells was 0.4-0.6 mg cm$^{-2}$ excluding the weight of the nickel core. This loading is calculated by mass-change calculation assuming weight change is only due to oxygen. The type 2032 coin cells were Galvanostatically discharged and charged using an Arbin potentiostat with a voltage range of 0.01-3.0 V vs. Li/Li$^+$. CV tests were carried out between 0.01-3.0V using a sweep rate of 0.5 mV s$^{-1}$ on an Bio-Logic VMP3. EIS (Bio-Logic VMP3) was carried out at a frequency range that varied from 10 mHz to 100 kHz with an AC signal amplitude of 10 mV. Galvanic cycling, CV, and EIS measurements were all carried out at room temperature (23° C.).

The Ni—NiO fibers were synthesized by electrospinning a sol-gel solution consisting of Nickel acetate (Ni(CH$_3$CO$_2$)$_2$) and polyvinylpyrrolidone (PVP) dissolved in ethanol. Oxygen was introduced into the nanofiber structure though calcination at 400° C. in air. The introduction of oxygen results in the formation of nickel oxide (NiO) nanofibers. The NiO fibers were reduced at 400° C. by hydrogen flow at 20 torr resulting in a dull grey nickel nanofiber cloth. A NiO shell was formed through partial calcination at 350° C. in air for half an hour, A detailed schematic of the process is illustrated in FIG. 1 along with images of the processed materials. Low temperature thermal treatments were utilized in order to keep the grain sizes small. Small grains act as a contributor to facilitate the formation of an advantageous polymer/gel-like coating that forms during cycling.

FIG. 1 shows A) Electrospinning process. B) As spun nanofiber matte. C) Calcined NiO nanofibers. D) Reduced Ni nanofibers. F) Partially calcined Ni—NiO nanofibers. F) Schematic of the thermal oxidation/reduction process.

Changes in the morphology resulting from thermal treatment were studied using SEM shown in FIG. 2. The as spun nanofibers in FIG. 2A show smooth nanofibers with a diameter of approximately 400 nm. Shown in FIG. 2B, the nanofiber diameter is approximately reduced in half to 200 nm post calcination. This results from the loss of acetate groups and polymer during thermal treatment. Post hydrogen reduction, the smooth morphology was lost as a result of a volume change from NiO to Ni, shown in FIG. 2C. FIG. 2D shows the formation of a NiO layer on the surface of the Ni nanofibers after partial calcination.

FIG. 2 shows A) SEM image of pre calcined fibers. B) SEM image of NiO fibers post calcination. C) SEM image of Ni fibers post hydrogen reduction. D) SEM image of Ni—NiO fibers with inset image of fibers surface.

The representative Transmission Electron Microscopy (TEM) images shown in FIG. 3 reveals a distinct oxide layer attributed to nickel oxide on the Ni—NiO fibers, roughly 20 nm in thickness. SAED confirms the presence of an amorphous oxide layer and a crystalline nickel core. The uneven surface morphology of the nickel core results from the reduction of NiO to Ni. The reduction creates nickel nanocrystals that are tightly bound together, which acts as the backbone of the Ni—NiO cloth fibers. The crystalline nickel and amorphous oxide layer TEM results shown in FIG. 3 is in agreement with the XRD and EDS results shown in FIG. 4.

FIG. 3 shows A) TEM image of Ni—NiO cloth fiber. B) TEM image of Ni—NiO cloth fiber showing NiO thickness with inset SAED.

The chemical composition of the Ni—NiO nanofibers were confirmed by XRD and EDS. FIG. 4A shows the XRD pattern of the fibers at different processing phases. The three XRD patterns correspond to NiO, Ni, and Ni—NiO nanofibers post calcination, reduction, and partial-calcination respectively. In FIG. 4A, the peaks at 37.1°, 43.1° and 62.6° represents the (111), (200), (220) planes of the NiO face-centered cubic crystal structure. The peaks at 44.5°, 51.8° and 76.4° coincides with the XRD pattern for nickel.[35] These peaks correspond to the (111), (200) and (220) planes of the face-centered cubic Ni crystals respectively. The XRD pattern for Ni—NiO nanofibers shows all the peaks from the previous two XRD patterns. The peaks at 37.1°, 43.1° and 62.6° for NiO are weaker because of the amorphous characteristic, while the peaks at 44.5°, 51.8° and 76.4° are stronger for Ni because of its high crystallinity. No carbon peaks were detected during XRD analysis of the Ni—NiO cloth nano fibers. This shows that the Ni—NiO fibers are only composed of Ni and NiO crystals and all excess carbon was burnt off.[22, 36] The XRD results are confirmed by both EDS and TEM shown in FIG. 4B, FIG. 3. The EDS spectra in FIG. 4B show the sole presence of nickel and oxygen within the structure. EDS mapping shows the nickel and oxygen distribution throughout the structure. The distribution of oxygen throughout the structure is represented by the inset image in FIG. 4C, giving a total of 2.28 wt % oxygen distributed evenly across the surface of the Ni—NiO nanofibers.

Figure 4:
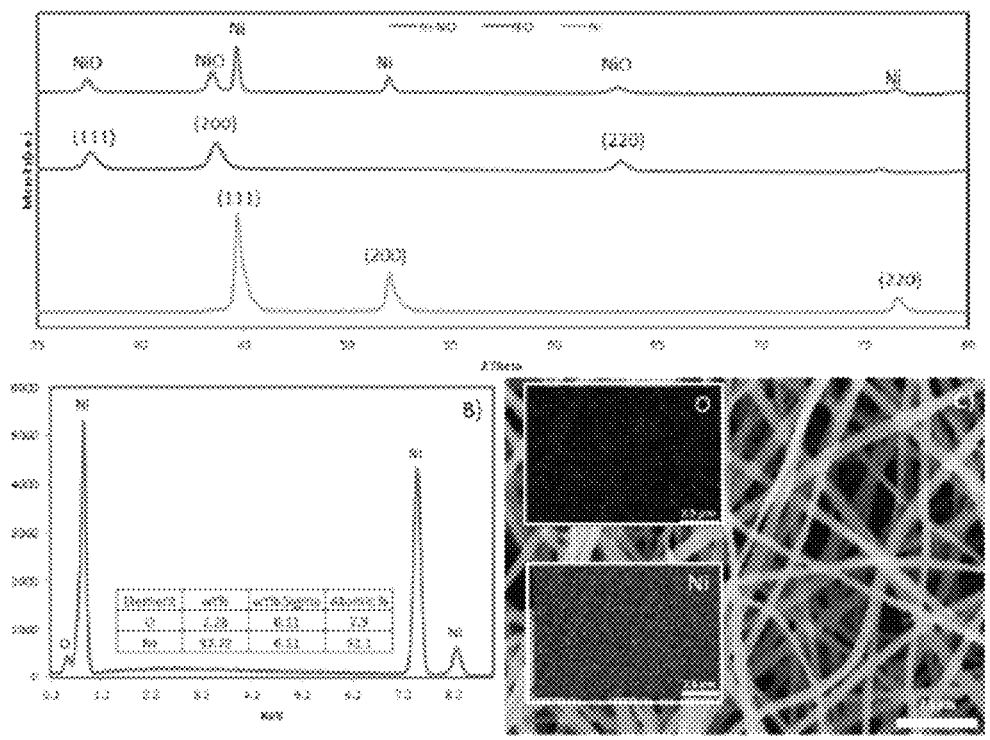
FIG. 4 shows x-ray data of fibers according to an example of the invention.

FIG. 4 shows A) X-ray powder diffraction of NiO Fibers, Ni Fibers, and Ni—NiO fibers. B) EDS spectra of Ni—NiO fibers with inset display showing weight percentages after partial calcination. C) SEM image of EDS mapped area with inset images of elemental mapping.

The electrochemical properties of the Ni—NiO nanofiber anode was evaluated using galvanostatic cycling, cyclic voltammetry (CV) and electrochemical impedance spectroscopy (EIS). The weight of NiO was calculated by the mass-change measurement, assuming the change mass from pure Ni fibers to partially calcined Ni—NiO fibers are purely due to the introduction of oxygen. The calculated weight was used to determine capacity and C rate. The CV was performed at a scan rate of 0.5 mV s$^{-1}$ over cycles 140 and cycles 161-470. FIG. 5A and FIG. 5B show the CV profiles for cycles 1-10, 161-170 respectively. As shown in FIG. 5A, the CV profile for cycles 2-10 exhibit similar peaks indicating stable cycling performance over the first few cycles. [26] The large difference in the CV profiles for cycles 1 and 2 is most notably the large peak at 0.5 V. The large cathodic peak around 0.5 V is attributed to the formation of the solid electrolyte interface (SEI) layer, the reduction of nickel oxide to nickel, and the formation of amorphous $Li_2O$ ($NiO+2Li^++2e^-\rightarrow Ni+Li_2O$).[12, 26] The cathodic peak at 0.5V is followed by an anodic peak at 2.25V. The anodic peak represents the decomposition of the polymer/gel-like layer and the reversible reduction of $Ni^0$ to $Ni^{2+}$. For the remainder of the cycles after the first, the anodic peak shifts to 1 V. The CV profiles for cycles 161-470 is very similar to cycles 2-10 although a current difference exists. The difference in current is attributed to a change in the peak current which alludes to a higher capacity and reactivity.[37] This coincides with the increase in capacity seen after 160 cycles shown in FIG. 6. The similarities in the curves indicate a very stable cycling performance and the stable formation of the SEI layer after 10 cycles. The stable cycling performance is attributed to the nickel backbone's ability to prevent damage caused by mechanical stress and strain from volume expansion/contraction of 95.68% during lithiation/delithiation of NiO.[38] As a result, the pulverization resistant structure provides a stable conductive network for NiO that is not prone to degradation during lithiation/delithation.[37] This is proven by a constant equivalent series resistance (ESR) of 2.7 for all cycles resulting in an impressive cyclability.

Figure 5:
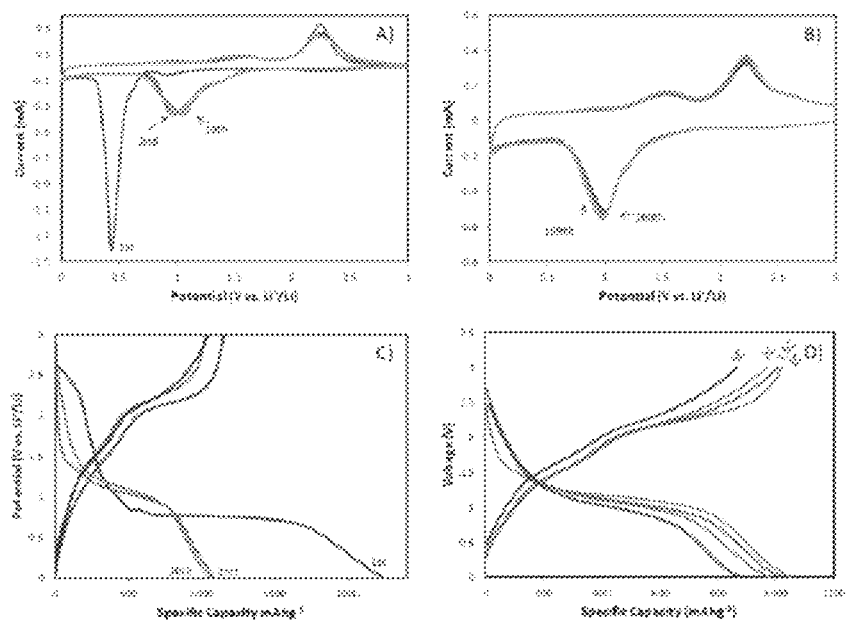
FIG. 5 shows electrical data of materials according to an example of the invention.

FIG. 5 shows A) CV of cycles 1-10 at a scan rate of 0.5 mVs$^{-1}$. B) CV of cycles 160-169 at a scan rate of 0.5 mVs$^{-1}$. C) Galvonastic voltage profiles for Ni—NiO fibers at 1 C for selected cycles. D) Galvonastic voltage profiles for Ni—NiO fibers at selected C-rates.

The charge-discharge profiles for the Ni—NiO nanofiber electrode between 0.01-3.0V is shown in FIG. 5. FIG. 5C shows the charge-discharge profiles at a rate of 1 C. The potential of the electrode during its first discharge in FIG. 5C exhibits a long plateau at 0.85V. The long plateau is attributed to the formation of the SEI layer, initial reduction of NiO to Ni, and the formation of amorphous $Li_2O$.[12] According to the voltage profile of FIG. 5C, the polymer/gel like layer starts to form during first discharge cycle around 0.85V, which is usually 0.7V for NiO, and 1.3V for all other cycles. This is consistent with the CV profiles of NiO reported in literature.[27, 32, 34, 39] The increased voltage plateau from 0.7V to 0.85 V for the first cycle results from the eased reaction of NiO with Li$^+$ to form Ni and $Li_2O$.[33, 34] The main cause of the eased reaction of NiO with Li$^+$ is the small grain sizes which promote the growth of a polymer/gel-like layer. The polymer/gel-like layer is formed when lithium ions form lithium alkyl carbonate with the electrolyte instead of reacting with the NiO, the lithium alkyl carbonates then build up on the surface of the electrode, forming a polymer/gel like layer. The advantages in the formation of these polymer/gel-like layers are the promotion of a higher capacity and better stability. Firstly, the polymer/gel-like layer causes pseudocapacitance behavior.

Figure 7:
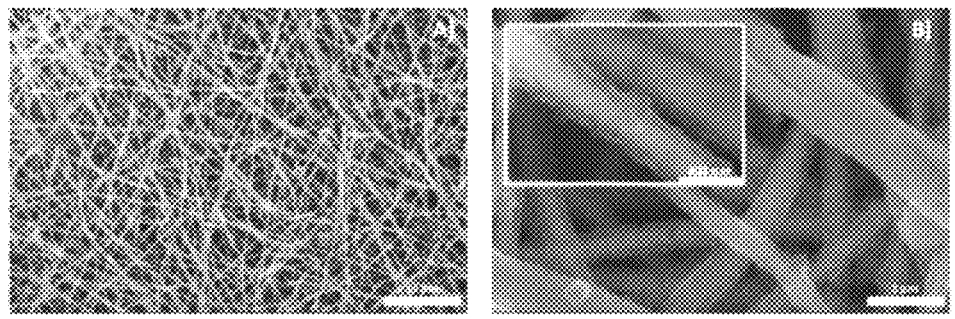
FIG. 7 shows micrographs of fibers according to an example of the invention.

Psuedocapacitance reactions are known to be highly reversible and to be a source of extra capacity. Secondly, the polymer/gel-like layer holds the active material tightly to the nickel backbone, not only improving the structures conductivity, but also holding the materials tightly together to help maintain its original morphology. As shown in FIG. 7, the Ni—NiO nanofiber electrode retains its original morphology after 400 cycles at 3 C, allowing the electrode to retain a greater portion of its capacity. This polymer/gel like layer remains attached to the surface of the electrode during the remainder of the discharge. During the charge cycle the polymer/gel like layer dissolves when the voltage exceeds 2V contributing to the change in the charge plateau from 2 V to 2.3 V.

The charge-discharge profile for cycles 2 and 30 in FIG. 5C exhibits similar curves alluding to the stability of the electrode under a cycling rate of 1 C. Increasing the cycling rates for the Ni—NiO nanofiber battery results in a higher charge plateau and lower discharge plateau shown in FIG. 5D. The change in plateaus is a result of a current density increase, causing a rise in the overpotential of the battery. Despite this, the charge-discharge curves for different cycling rates exhibit similar curves, a plateau between 1.4-0.7V shown in FIG. 5D. The similarity in the plateaus correlates to the Ni—NiO nanofiber battery's excellent rate performance which is attributed to the rigidity of the nickel as a conductive network during higher cycling rates and the stable formation of the SEI layer. A stable conductive network enhances electrochemical activity by improving electron transport. A stable SEI layer prevents the continual re-formation of a thicker SEI layer which reduces the ionic conductivity and greatly affects the rate capability.

Figure 6:
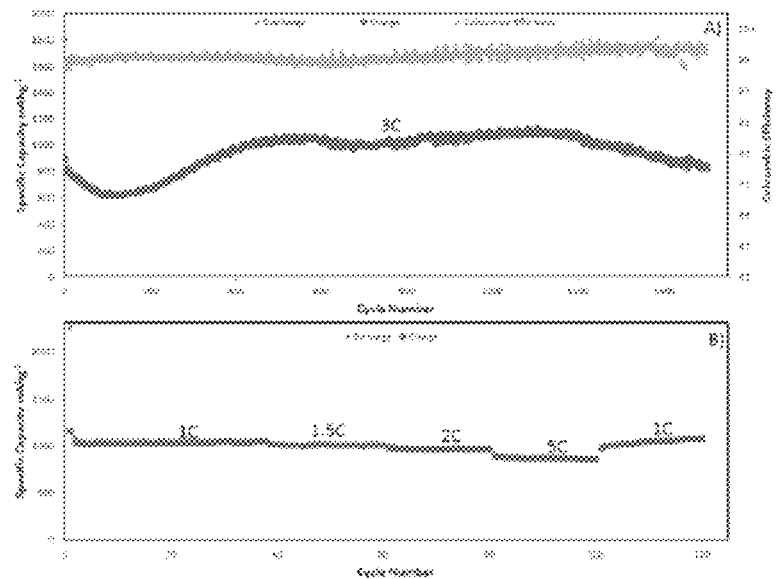
FIG. 6 shows additional electrical data of materials according to an example of the invention.

FIG. 6 shows A) Deep Galvanostatic cycling at 3 C for more than 1000 cycles. B) Galvanostatic cycling at 1 C, 1.5 C, 2 C, and 5 C over 120 cycles.

The Galvanostatic cycling was carried out in the potential window of 0.01 V-3.0 V using a lithium metal wafer as the counter electrode. As in FIG. 6A, the capacity was measured at a charging rate of 3 C for all cycles. The Ni—NiO batteries show excellent stability and a Coulombic efficiency of >99%. The initial capacity is recorded at 1801 mAh $g^{-1}$, over the next 160 cycles the capacity decreases to 626 mAh $g^{-1}$ before increasing again over the next 840 cycles. The decrease in capacity is attributed to the high charge transfer resistance for the first 160 cycles. After 160 cycles, the capacity starts to increase due to a lower charge transfer resistance. This alludes to more of the surface area of the NiO being activated during lithiation/delithiation. The wave like fluctuation in capacity for cycles 100-1000 results from temperature changes occurring inside the room where galvanostatic cycling took place. The increase in capacity over 718 mAh $g^{-1}$ can be attributed to a few possible explanations. Do et al. proposed that the increase in capacity results from decreased grain sizes promoting the amount of surface area for nickel oxide to form on the nickel backbone while also promoting the formation of a polymer/gel-like layer. Other groups proposed that reversible growth of polymeric/gel-like layers is attributed to the kinetic degradation of the electrolyte. We attribute the increase in capacity to the nickel backbone acting as an effective catalyst for electrolyte decomposition promoting the continual growth of polymeric/gel-like layers. This results in the battery lasting 1500 cycles while retaining all of its original capacity.

FIG. 7 shows A) SEM image post 400 Cycles at 3 C. B) SEM image post 400 Cycles at 3 C with inset image magnifying fiber structure.

Rate capability is becoming an important factor in next generation LiBs. The rate capability of the Ni—NiO electrode was evaluated over various charge-discharge rates based on the amount of NiO for 120 cycles. Shown in FIG. 6B, the first cycle exhibits a capacity of 2240 mAh $g^{-1}$ and was charged-discharged at a rate of C/10 to ensure proper formation of the SEI layer. At a cycling rate of 718 mA $g^{-1}$, the Ni—NiO electrode exhibits a capacity of 1084 mAh $g^{-1}$ that is well maintained for 60 cycles. Increasing the cycling rate to 1.5 C, 2 C, 5 C for twenty cycles each results in a capacity loss of 2.5%, 6.5%, and 16.2% respectively when compared to the first 60 cycles. Full recovery of the original capacity is achieved when the cycling rate is returned to 1 C. The Ni—NiO excellent rate capability is attributed to the stability of the electrode architecture under higher current densities, which maintains the conductivity of the system. Post cycling images in FIG. 7 confirm the ability of Ni—NiO to maintain its initial morphology after 400 cycles at 3 C, showing very little to no degradation. These results show that the free-standing Ni—NiO nanofiber, compared to that of a slurry cast electrode, has a longer life, a higher capacity, a better stability, and a better rate capability without damaging the electrode. This is due to the elimination of binders and conductive additives that would otherwise reduce the overall gravimetric capacity and the formation of a stable SEI layer that would otherwise reduce ionic conductivity.

Figure 8:
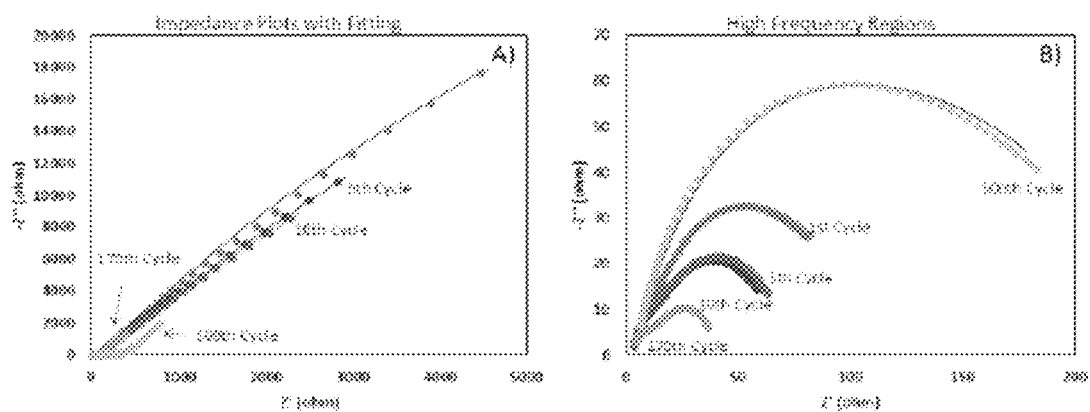
FIG. 8 shows additional electrical data of materials according to an example of the invention.

FIG. 8 shows A) Shows complex impedance plots of Ni—NiO nanofiber anode for selected cycles. B) Shows high frequency regions of plots.

Complex impedance plots for the first ten cycles, near 170 cycles, and near 500 cycles were obtained by running potentiostatic electrochemical impedance spectroscopy (PEIS). Electrochemical impedance spectroscopy (EIS) is a technique that applies a small sinusoidal of varying frequency and measures the resultant complex impedance. For the current investigation, 10 mV sinusoidal signals with frequencies ranging from 10 mHz to 100 kHz were applied. The plots contain the following distinct features: a high frequency intercept, two curves resembling semicircles at the higher frequency end, and a low frequency tail. FIG. 8A shows complex impedance plots for selected cycles and their model fits in accordance with the impedance of the electrical equivalent circuit shown in FIG. 9.

The high frequency intercepts represent electronic resistance in conductive material within the electrode in combination with the ionic resistance of the electrolyte, often presented as the equivalent series resistance (ESR). The Ni—NiO anode has a comparatively low ESR. More remarkably, this Ohmic resistance does not increase with cycling but stays at its initial value throughout 170 cycles, as shown in Table 1. This supports the claim that the nickel backbone provides a robust conductive network for the Ni—NiO anode that can withstand volume change during lithiation/delithiation without deterioration.

Another thing to notice is the slight mismatch in fitting for the first cycle seen in FIG. 8B. The equivalent circuit is composed of modeled parameters design to predict electrochemistry within a LIB cell. While the cell behavior becomes more predictable during later cycles, it may sometimes show evidence electrochemical steps that only are present during the first cycle (not represented in the equivalent circuit model).

Figure 9:
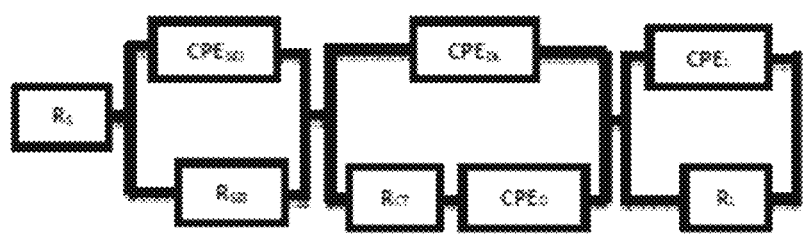
FIG. 9 shows an example circuit of a device formed according to an example of the invention.

FIG. 9 shows electrical equivalent circuit used for fitting the complex impedance plots.

A low and stable value for ESR is indicative of excellent rate capabilities as observed during Galvanostic cycling. The first semicircle shape represents a frequency dependent complex impedance of the solid-electrolyte interphase that forms on the surface of the active material due to irreversible reactions involving lithium ions and solvent molecules. The diameter of the semicircle represents the resistance due to the solid-electrolyte interphase (SEI) layer, listed here as $R_{SEI}$. The second semicircle contains impedance information on the electrochemical double layer that forms at the electrode-electrolyte interface. The reaction kinetics that allows a battery to store energy takes place in this electrochemically active region. The diameter of this semicircle represents charge-transfer resistance or reaction resistance ($R_{CT}$) for the redox reactions involved in lithium ion exchange at the electrode.

| Cycle | ESR | Rsei | Rct |
| --- | --- | --- | --- |
| 1 | 2.7 | 5 | 88 |
| 2 | 2.7 | 7.5 | 65 |
| 3 | 2.7 | 7.5 | 62 |
| 4 | 2.7 | 8 | 60 |
| 5 | 2.7 | 9 | 53 |
| 10 | 2.7 | 10 | 56 |
| 170 | 2.7 | 10 | 27 |
| 501 | 3.5 | 60 | 150 |

Table 1 (above) lists relevant parameters obtained from EIS analysis of Ni—NiO anode. Table 1 shows the evolution of $R_{SEI}$ and $R_{CT}$ with cycling for our Ni—NiO anode. The SEI resistance increases during the initial ten cycles while the electrochemically inert layer formed on active material surface. $R_{SEI}$ stabilizes thereafter and maintains the same value through 170 cycles. Stable formation of the SEI layer is mandatory for good rate capabilities and cycling stability and is coherent in light of the excellent cycle life demonstrated in FIG. 6B.[45] The sharp increase in SEI observed after 500 cycles may be due to the desolvation of gel/polymer layer formed on NiO surface, which led to new SEI formation. The $R_{CT}$ decreases sharply during the initial cycles and continues to decrease through 170 cycles. The $R_{CT}$ is expected to decrease with cycling in a high surface-area electrode, as more of the active material surface is activated via repeated lithiation/delithiation of the electrode. The results of EIS confirm the crucial role of the nickel backbone in enhancing the stability of the free-standing Ni—NIO cloth anode and the stable formation of the SEI layer.

In summary, we have presented here a novel free standing Ni—NiO cloth anode synthesized by electrospinning followed by thermal oxidation/reduction processes. As an anode material for next generation LIBs, the free standing Ni—NiO cloth anode exhibits an outstanding high capacity of 1054 mAh $g^{-1}$, a long life of 1000 Cycles at 3 C or 2154 mA $g^{-1}$, and an great rate capability up to 5 C or 3590 mA $g^{-1}$. This work demonstrates a facile approach for achieving impressive performance using Ni—NiO cloth as an anode. The results presented here show that the free standing Ni—NiO cloth electrode is capable of replacing graphite anodes and providing the performance needed in LiBs for the next generation of portable and flexible electronics.

Figure 10:
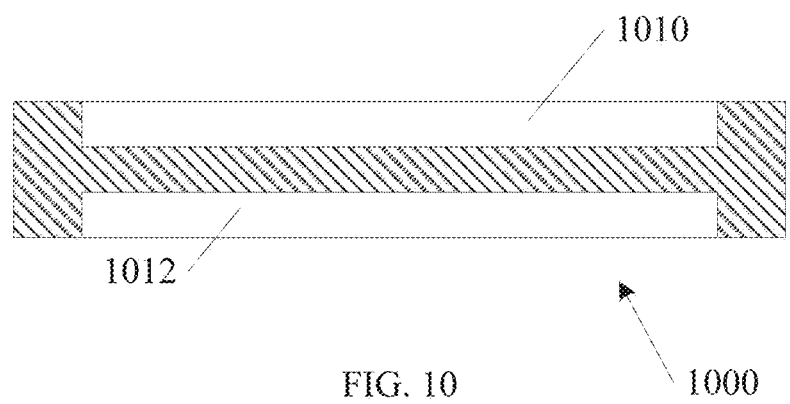
FIG. 10 shows a battery according to an example of the invention.

FIG. 10 shows an example of a battery 1000 according to an embodiment of the invention. The battery 1000 is shown including an anode 1010 and a cathode 1012. An electrolyte 1014 is shown between the anode 1010 and the cathode 1012. In one example, the battery 1000 is a lithium-ion battery. In one example, the anode 1010 is formed from a metal oxide fiber cloth as described in examples above. In one example, although the invention is not so limited, the battery 1000 is formed to comply with a 2032 coin type form factor.

Figure 11:
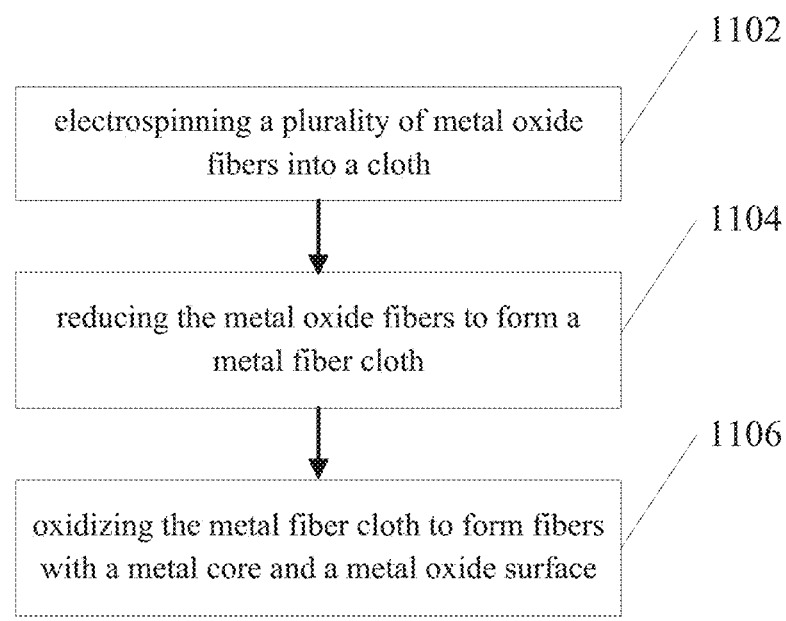
FIG. 11 shows a method of forming a material according to an example of the invention.

FIG. 11 shows an example method of forming according to an embodiment of the invention. In operation 1102 a plurality of metal oxide fibers are formed into a cloth, for example, by electrospinning. In operation 1104, the metal oxide fibers are reduced to form a metal fiber cloth. In operation 1106, the metal fiber cloth is oxidized to form fibers with a metal core and a metal oxide surface.

While a number of advantages of embodiments described herein are listed above, the list is not exhaustive. Other advantages of embodiments described above will be apparent to one of ordinary skill in the art, having read the present disclosure. Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above structures and fabrication methods are used. The scope of the invention should be determined with reference to the appended claims, along with the full scope of equivalents to which such claims are entitled.

What is claimed is:
1. A battery, comprising:
   a first electrode, including:
   a fiber cloth wherein the fibers include a metal core and a smooth metal oxide surface;
   wherein the metal core is crystalline and the metal oxide surface is amorphous;
   a second electrode; and
   an electrolyte in contact with both the first electrode and the second electrode.
2. The battery of claim 1, wherein the fibers include a nickel metal core and a nickel oxide surface.
3. The battery of claim 1, wherein the fibers have a diameter less than approximately 1 micro meter.
4. The battery of claim 1, wherein the metal oxide surface has a thickness of approximately 20 nanometers.
5. The battery of claim 1, wherein the metal oxide surface includes a continuous shell of consistent thickness.

* * * * *